United States Patent
Baker et al.

(10) Patent No.: US 12,454,358 B2
(45) Date of Patent: Oct. 28, 2025

(54) AIRCRAFT SEAT MOTION PLANNER AND SEAT ARCHITECTURE

(71) Applicant: B/E Aerospace, Inc., Winston-Salem, NC (US)

(72) Inventors: Bryce C. Baker, Raymore, MO (US); Fangzhong Guo, Shoreline, WA (US)

(73) Assignee: B/E Aerospace, Inc., Winston-Salem, NC (US)

(*) Notice: Subject to any disclaimer, the term of this patent is extended or adjusted under 35 U.S.C. 154(b) by 219 days.

(21) Appl. No.: 18/144,461

(22) Filed: May 8, 2023

(65) Prior Publication Data

US 2024/0375779 A1    Nov. 14, 2024

(51) Int. Cl.
*B64D 11/06* (2006.01)

(52) U.S. Cl.
CPC ...... *B64D 11/06395* (2014.12); *B64D 11/064* (2014.12)

(58) Field of Classification Search
None
See application file for complete search history.

(56) References Cited

U.S. PATENT DOCUMENTS

| | | | |
|---|---|---|---|
| 6,663,184 B2 | 12/2003 | Hagiike | |
| 9,517,767 B1* | 12/2016 | Kentley | B60W 30/08 |
| 10,052,976 B2* | 8/2018 | Atger | B60N 2/62 |
| 11,008,104 B2 | 5/2021 | Streckert et al. | |
| 2002/0109389 A1* | 8/2002 | Satoh | B60N 2/0292 |
| | | | 297/423.19 |
| 2006/0103193 A1 | 5/2006 | Kramer | |
| 2008/0201039 A1 | 8/2008 | Matsuoka et al. | |
| 2010/0176632 A1 | 7/2010 | Alford et al. | |
| 2010/0282902 A1* | 11/2010 | Rajasingham | B60N 2/012 |
| | | | 297/284.3 |
| 2015/0206439 A1 | 7/2015 | Marsden et al. | |
| 2018/0111511 A1* | 4/2018 | Lota | B60N 2/0278 |
| 2019/0126775 A1* | 5/2019 | Han | B60L 3/12 |
| 2021/0086662 A1 | 3/2021 | Gempel et al. | |

(Continued)

FOREIGN PATENT DOCUMENTS

| | | |
|---|---|---|
| DE | 102004037914 B4 | 8/2006 |
| DE | 102021109828 A1 | 10/2022 |

OTHER PUBLICATIONS

European Patent Office, Extended European Search Report received in EP Application No. 24173687.5, Aug. 30, 2024, 7 pages.

*Primary Examiner* — Donald J Wallace
*Assistant Examiner* — Robert L Pinkerton
(74) *Attorney, Agent, or Firm* — Suiter Swantz IP

(57) ABSTRACT

A system for seat motion planning includes a seat installable in an environment, the seat including a plurality of adjustable components, a plurality of actuators configured to move the adjustable components, and a seat controller configured to operate the plurality of actuators. The system further includes a motion planner communicatively coupled to the seat controller configured to access a seat motion plan from a plurality of seat motion plans stored in memory, access a model of the environment including at least one object affecting the seat motion plan, and modify the seat motion plan to account for the at least one object. In embodiments, the motion planner is implemented as an application executable by a processor configured to execute other, separate seat-related applications.

16 Claims, 4 Drawing Sheets

(56) References Cited

U.S. PATENT DOCUMENTS

2022/0331028 A1* 10/2022 Sternitzke ............ G05D 1/0094
2023/0046054 A1 2/2023 Harris
2024/0208370 A1* 6/2024 Herrmann .............. B60N 2/005

* cited by examiner

AIRCRAFT SEAT MOTION PLANNER AND SEAT ARCHITECTURE

TECHNICAL FIELD AND BACKGROUND

The present disclosure relates generally to passenger seat motion planning, and more particularly, to seat controller configured to implement obstacle free motion planning using a point cloud model of the seat environment, kinematic model, and occupancy to calculate a collision free path without requiring manual tuning.

Aircraft seats may be highly adjustable, particularly business class and premium class passenger seats. Seat adjustments are typically actuator driven. In some cases, highly adjustable seats may include more than a dozen separate actuators. Adjustable seat components may include, but are not limited to, the backrest, seat pan, leg rest, armrests, headrest, and lumbar. Each seat component may be segmented to provide further adjustment capability.

Each individual actuator drives component adjustment by rotational and/or linear motion. Actuators may be independent or dependent, wherein an independent actuator operates as a primary driver and a dependent actuator operates considering the operation of its respective independent actuator(s). Actuators may move at different speeds, and may operate separately or in groups to transition the seat between preset sitting positions, for instance upright for taxi, takeoff, and landing (TTOL), and lie-flat during flight, through various intermediate sitting positions.

Motion planning is the process whereby the actuators are coordinated to transition the seat between the different sitting positions. For example, one motion plan may transition the seat from upright to lie-flat, whereas another motion plan may transition the seat from upright to cradle recline. Motion plans consider the actuators and their performance capabilities in order to program a plan to transition the seat in a smooth, timely, ergonomic, and orchestrated manner.

In addition to the seat actuators, motion plans consider the environment in which the seat operates. For example, motion plans may consider surrounding furniture, shells, partitions, and other obstacles that may affect the motion path. As the number of actuators and obstacles increases, so does the complexity of the motion plan programming code. In some cases, where a seat includes in excess of a dozen actuators and the environment includes obstacles, the motion plan may require thousands of lines of code requiring weeks to months to create. Similar time and efforts are also required when seat and environmental changes are made.

Therefore, what is needed is an adaptable, real-time motion planner that obviates the need for laborious and time-consuming programming efforts.

BRIEF SUMMARY

In one aspect, embodiments of the inventive concepts disclosed herein are directed to a system for seat motion planning. In embodiments, the system includes a seat installable in an environment, the seat including a plurality of adjustable components, a plurality of actuators configured to move the adjustable components, and a seat controller configured to operate the plurality of actuators. The system further includes a motion planner communicatively coupled to the seat controller, the motion planner including a processor configured to access a seat motion plan from a plurality of seat motion plans stored in memory, access a model of the environment, the model including at least one object affecting the seat motion plan, and modify the seat motion plan to account for the at least one object.

In some embodiments, the system further includes at least one sensor positioned in the environment in which the seat is installed, the at least one sensor configured to detect at least one transient object in the environment affecting the seat motion plan, and the motion planner is further configured to receive outputs from the at least one sensor and further modify the seat motion plan to account for the at least one detected transient object.

In some embodiments, the at least one sensor includes at least one millimeter wave (mmWave) radar, a proximity sensor, and a camera.

In some embodiments, the at least one detected transient object is a person.

In some embodiments, the seat motion plan includes instructions for the seat controller to transition the seat from a first predetermined sitting position to a second predetermined sitting position different from the first predetermined sitting position.

In some embodiments, the seat motion plan includes a first seat motion to be performed by at least one independent actuator and a second seat motion to be performed by at least one dependent actuator, wherein the first seat motion is programmed to start before the second seat motion, and wherein the modification to the seat motion plan includes at least one of delaying the start of the second seat motion, pausing the second seat motion, slowing a speed of the first seat motion, slowing a speed of the second seat motion, increasing a speed of the first seat motion, and increasing a speed of the second seat motion.

In some embodiments, the seat motion plan includes a predetermined time interval for completing a transition from the first predetermined sitting position to the second predetermined sitting position, and the modification to the seat motion plan includes at least one of delaying a start of a seat motion, pausing a seat motion, slowing a speed of a seat motion, increasing a speed of a seat motion, and varying a speed of a seat motion.

In some embodiments, the plurality of adjustable components includes at least a seat pan, a backrest, and a leg rest, and the plurality actuators includes at least one actuator coupled to the seat pan, at least one actuator coupled to the backrest, and at least one actuator coupled to the leg rest.

In some embodiments, the environment is an aircraft passenger cabin and the at least one object includes at least one of a shell positioned behind the seat, and ottoman positioned forward of the seat, and a console positioned to one side of the seat.

In some embodiments, the system further comprises a multiple process control board including a processor configured to run a plurality of separate applications including the motion planner as an application and at least one of a seat control application, a lighting application, a comfort control application, an obstacle detection application, and a predictive health management application, and each of the motion planner application, the seat control application, the lighting application, the comfort control application, the obstacle detection application, and the predictive health management application is configured to be modified without affecting any other one of the applications.

In another aspect, embodiments of the inventive concepts disclosed herein are directed to a motion planner for a seat including a seat controller, at least one actuator configured to adjust a position of a seat component, and at least one further actuator configured to adjust a position of at least one further seat component, wherein the seat is positioned in an environment. In embodiments, the motion planner is configured to be communicatively coupled to the seat controller, and the motion planner is configured to be implemented as an application executable by a processor configured to access a seat motion plan from a plurality of seat motion plans stored in memory, access a model of the environment including at least one object affecting the seat motion plan, and modify the seat motion plan to account for the at least one object.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
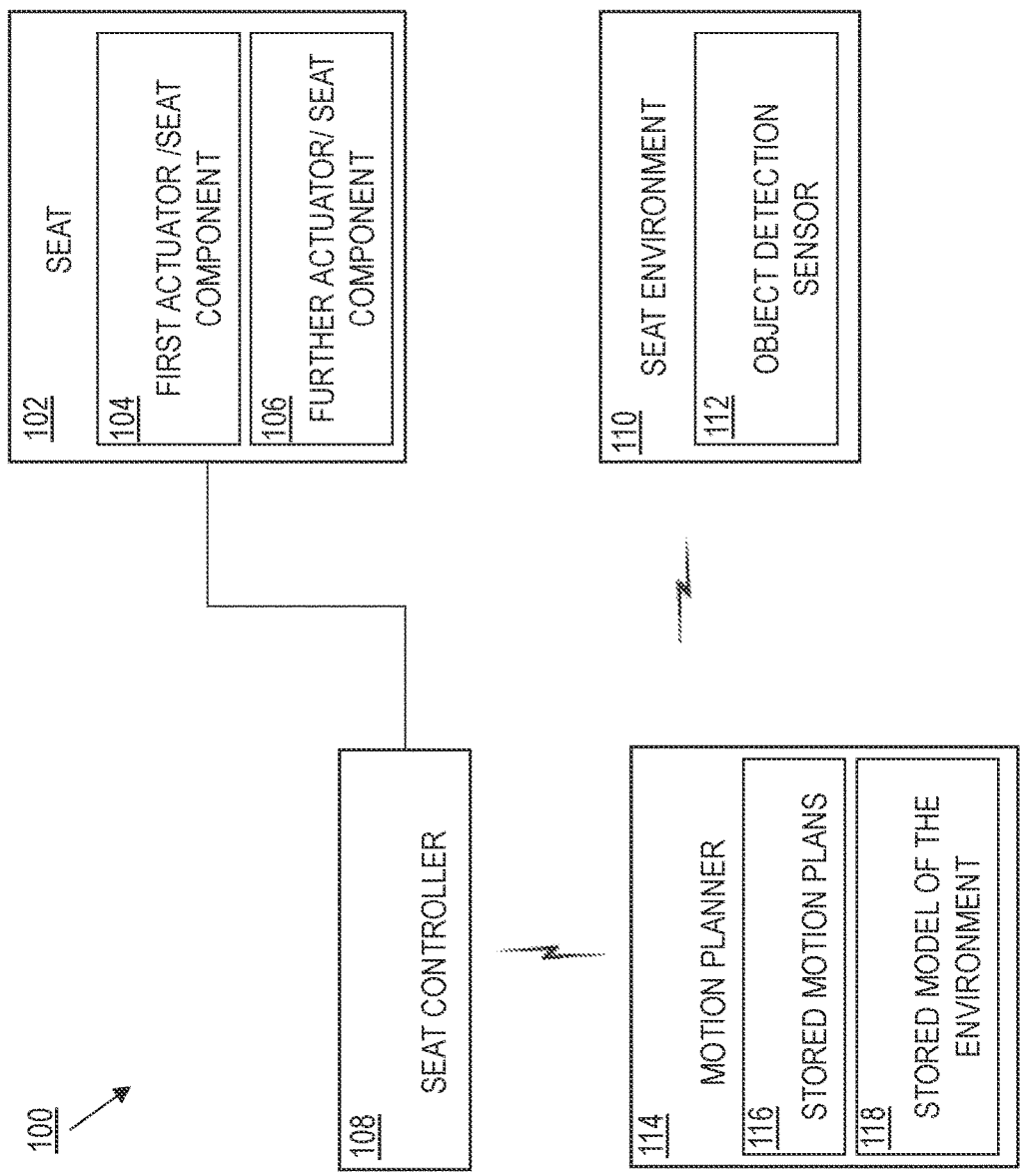
FIG. 1 is a block diagram illustrating a system for seat motion planning, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for seat motion planning. In embodiments, the seat is configured to adjust between different sitting positions, for instance upright for taxi, takeoff, and landing (TTOL), lie-flat during flight, and various intermediate sitting positions. The seat is configured to transition between preset sitting positions according to motion plans for adjusting seat components. The term "motion plan" as used herein may mean positions of the respective actuators corresponding to a predefined sitting position. For example, a motion plan according to the present disclosure may mean movement of the respective actuators from first definite positions to second definite positions (e.g., preset positions to preset positions) according to a calculated plan as discussed below. The system includes a motion planner configured to consider a map of the installation environment of the seat, such that the motion plan may be created and/or modified considering obstacles present in the environment. In some embodiments, the environment optionally includes at least one sensor configured to monitor transient objects that further affect the motion plan, and the motion planner is configured to receive outputs from the at least one sensor to further modify the motion plan as necessary. The seat includes a plurality of actuators coordinated to perform the seat adjustments. In embodiments, modifying the motion plan includes at least one change to the performance of the actuators considering the objects, fixed and transient, present in the environment. By considering and monitoring the environment, the motion plan can be modified in real time.

FIG. 1 is a block diagram illustrating a system 100 for seat motion planning. The system 100 includes a seat 102, for instance a business, premium, or super first-class passenger seat for an aircraft. The seat 102 includes physical components such as a seat pan, backrest, leg rest, armrests, headrest, lumbar, climatization, lighting, etc. Each physical component may be operative and/or position adjustable by at least one of rotation, translation, extension, etc. Adjustments may be performed by actuators coupled to their respective seat component(s). Actuators may be configured to provide at least one of rotational and linear motions, among other motions.

Each actuator may be categorized as independent or dependent depending on its respective adjustable component and function. Independent actuators may operate irrespective of any other actuator. In some embodiments, an independent actuator 104 may be a primary driving member that initiates seat motion, whereas a dependent actuator 106 may be a secondary driver whose motion depends on the motion of at least one independent actuator or another dependent actuator. For example, for a seat including a seat pan, a backrest, and a leg rest, each of which are position adjustable, seat pan adjustment may be controlled by an independent actuator whereas backrest and leg rest adjustment may be controlled by separate dependent actuators. As such, when the seat transitions between different sitting positions, the primary driver of the seat motion may be the seat pan actuator whereas the secondary drivers may be the backrest actuator and the leg rest actuator. Actuators may be grouped to coordinate movements of the various seat components. The seat 102 may include any number of independent and dependent actuators organized in any predetermined actuator grouping(s) depending on the motion plan. In some embodiments, the seat 102 may include at least a dozen actuators.

In embodiments, the seat 102 is configured to adjust between different sitting positions. The instructions for transitioning the seat between different sitting positions is referred to herein as a "seat motion plan" or "motion plan," and the different seat motion plans are executed by a seat controller 108. For example, the seat controller 108 may be programmed with one seat motion plan to transition the seat from an upright sitting position to a lie-flat position, another seat motion plan to transition the seat from an upright sitting position to a lounge sitting position, another seat motion plan to transition the seat from a lie-flat position to an upright position, etc. Seat motion plans may be provided to transition the seat from any one sitting position to any other sitting position. Preset sitting positions may be graphically presented to the passenger for selection, for instance via a passenger control application provided on a passenger seat controller. The activation and coordination of the different seat actuators for completing a seat motion plan is executed via the seat controller 108. In some embodiments, "motion plan" refers to an instruction to transition the seat from a first set of definite positions of the seat actuators corresponding to a first sitting position, to a second set of definite positions of the seat actuators corresponding to a second sitting position, and the manner in which that transition occurs is a product of a systems and methods disclosed herein.

The seat 102 is installable in a seat environment 110, for instance an aircraft passenger cabin. The environment may include obstacles positioned proximate the seat that may affect a seat motion plan, for instance, a seat shell positioned behind the backrest, deployable tray table, console, desk, ottoman, etc. The seat operates in an environment in which obstacles must be considered when executing the different seat motion plans. Transient obstacles may also enter and leave the seat environment, for instance persons, luggage, movable structures, etc. These transient obstacles must also be considered in the seat motion plan. The environment may further include various entrapment zones that affect the seat motion plan. For example, entrapment zones may exist between the backrest and the seat shell, between the leg rest and a forward ottoman, between the side of the seat and a console, etc. Obstacles may enter and leave these designated entrapment zones, and the presence of such obstacles also affect the seat motion plans.

In embodiments, the system 100 further includes at least one object detection sensor 112 positioned in the environment. In use, the at least one object detection sensor 112 is configured to monitor the environment to detect the presence of objects affecting the seat motion plans. Objects may be a permanent part of the environment, such as the furniture and monuments mentioned above, or transient meaning entering the environment space temporarily. As stated above, examples of transient objects include people, luggage, personal articles, and deployed amenities. In some embodiments, the at least one object detection sensor 112 is positioned apart from the seat, for instance overhead with respect to the seat such that the field of view of the at least one sensor includes the seat, the immediately surrounding environment, and entrapment zones.

In embodiments, the at least one object detection sensor 112 may be a millimeter wave (mmWave) radar configured to output a map of the environment in which the seat operates, a camera or other vision-based sensor configured to output images of the environment in which the seat operates, or a proximity sensor configured to detect the presence of objects relative to the sensor. The at least one object detection sensor 112 may be operable for continuously monitoring the environment, and in particular, monitor entrapment zones that may affect the seat motion plans. In some embodiments, the camera captures frames to determine object and seat component movements.

The system 100 further includes a motion planner 114. In some embodiments, the motion planner 114 is communicatively coupled to each of the seat controller 108 and optional at least one object detection sensor 112. In embodiments, the motion planner 114 includes a processor configured to access a seat motion plan from a plurality of seat motion plans stored in memory, access a stored model of the environment 118 including objects, and receive outputs from the optional at least one object detection sensor 112. When an object is determined to be present in the travel path of a physical seat component of the seat motion plan, the motion planner 114 is configured to modify the seat motion plan accordingly.

The motion planner 114 is configured to receive, determine, instruct, execute, etc. The motion planner 114 may include at least one processor, memory, and a communication interface. The processor provides processing functionality for at least the motion planner 114 and may include any number of processors, micro-controllers, circuitry, field programmable gate array (FPGA) or other processing systems, and resident or external memory for storing data, executable code, and other information accessed or generated by motion planner 114. The processor may execute one or more software programs embodied in a non-transitory computer readable medium (e.g., memory) that implements techniques described herein. The processor is not limited by the materials from which it is formed, or the processing mechanisms employed therein and, as such, can be implemented via semiconductor(s) and/or transistors (e.g., using electronic integrated circuit (IC) components), and so forth.

The memory may be an example of tangible, computer-readable storage medium that provides storage functionality to store various data and/or program code associated with operation of the processor, such as software programs and/or code segments, or other data to instruct the processor, and possibly other components of the controller, to perform the functionality described herein. Thus, the memory can store data, such as a program of instructions for operating the motion planner 114, including its components (e.g., processor, communication interface, etc.), and so forth. It should be noted that while a single memory is described, a wide variety of types and combinations of memory (e.g., tangible, non-transitory memory) may be employed. The memory may be integral with the processor, may comprise stand-alone memory, or may be a combination of both. Some examples of the memory may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface may be operatively configured to communicate with components of the motion planner 114. For example, the communication interface may be configured to retrieve data from the processor or other devices, transmit data for storage in the memory, retrieve data from storage in the memory, and so forth. The communication interface may also be communicatively coupled with the processor to facilitate data transfer between components of the motion planner 114 and the processor. It should be noted that while the communication interface is described as a component of the motion planner 114, one or more components of the communication interface may be implemented as external components communicatively coupled to the motion planner 114 via a wired and/or wireless connection. The motion planner 114 may also include and/or connect to one or more input/output (I/O) devices (e.g., human machine interface (HMI) devices) via the communication interface. In embodiments, the communication interface may include a transmitter, receiver, transceiver, physical connection interface, or any combination thereof.

In embodiments, a seat motion plan may include a first seat motion to be performed by a first actuator 104 (e.g., independent actuator), and at least one second seat motion to be performed by at least one further actuator 106 (e.g., dependent actuator(s)). The first seat motion may be programmed to start before the second seat motion, for example, seat pan motion first and backrest motion second. The seat motion plan is executed by the seat controller 108 activating the various actuators according to a predetermined sequence and actuator performance in order to complete the seat transition. For example, each actuator may be programmed to operate for a predetermined duration, at a predetermined speed, at a variable speed, according to a predetermined sequence, forward or reverse, etc.

The motion planner 114 includes in memory a model of the environment as a resource for use by the motion planner 114. In embodiments, the model may be a plan of the environment including obstacles therein at predetermined positions and elevations. When a seat motion plan is selected, the motion planner 114 accesses the plan from memory and uses the plan to identify obstacles to perform the seat motion and modify the seat motion plan as necessary to avoid collisions. Plans may be created using conventional mapping techniques and inputted as CAD files or like files into the motion planner memory.

The motion planner 114 further utilizes various seat configurations stored in memory as resources. Seat configurations may include, but are not limited to, seat type, model number, seat geometry, performance parameters, physical seat components, etc. Seat configurations may be loaded and stored in memory and a configuration selected for use by the motion planner 114. The plan and seat configuration are used cooperatively by the motion planner 114. The motion planner 114 is continuously updated with the appropriate plan and current status of the actuators, via the seat controller 108, indicating the current seat position. The motion planner 114 interfaces with the seat controller 108 to relay actuator information corresponding to the present state of the seat 102. Sensing equipment may further include an encoder known to those skilled in the art. The motion planner 114 may interface with the sensing equipment to determine the position/velocity of the seat in order to calculate the distance in real-time to obstacles on the plan. Based on the seat configuration, distance to obstacles, and position/velocity of the seat, as well as other parameters, the motion planner 114 calculates and predicts the distance to obstacles and intervenes as necessary to modify the seat motion plan to avoid collisions with obstacles.

Figure 2:
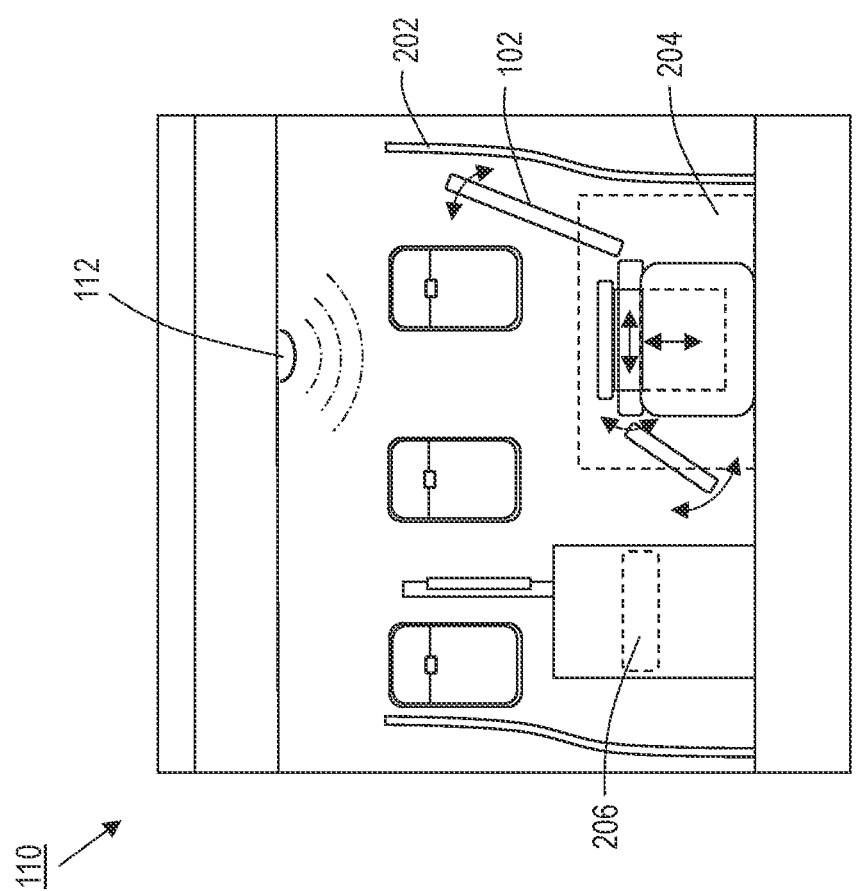
FIG. 2 is a schematic illustration of an aircraft cabin environment including an adjustable passenger seat controllable by a motion planner, in accordance with example embodiments of this disclosure.

FIG. 2 illustrates a non-limiting example of an environment 110 in which the seat operates, for instance a premium class portion of an aircraft passenger cabin. In the environment 110, positional relationships exist between the seat 102 and fixed obstacles such as a shell 202, console 204, and ottoman 206, among others. The seat includes physical components, each of which may be positional adjustable. For example, the backrest and the leg rest may be configured to rotate, the seat pan may be configured to translate and/or rotate, and certain seat components may be further configured to extend. Each motion is driven by at least one actuator. The environment 110 further includes the at least one sensor 112 configured to continuously monitor the environment and physical seat components. More than one sensor 112 may be required depending on the configuration of the environment, location of obstacles, types of objects/motions to be detected, seat configuration, entrapment zones, etc.

The seat 102 is shown in a generally upright sitting position. The seat 102 is configured for multiple degrees of freedom (e.g., 2 to 16 to n degrees of freedom). A non-limiting example of a motion plan may include a transition from upright to lie-flat in which the physical seat components align to form a horizontal bed. The transition instructions may include, for example, starting seat pan translation followed by starting backrest rotation followed by starting leg rest rotation. Movements may be started sequentially or simultaneously depending on the physical seat components. A motion plan may be completed in a predetermined time period and according to a predetermined sequence to provide a smooth and comfortable motion for the passenger.

In the illustrated environment 110, the backrest travel path is affected by the shell 202 and any of the physical seat components may be affected by transient objects entering the environment 110 and objects entered into entrapment zones, for instance between the backrest and the shell 202 or between the leg rest and the ottoman 206. Such fixed and transient objects affect the motion plan. In embodiments, when a sitting position change is selected, the motion planner operates considering the seat configuration stored in memory, environment plan stored in memory, and outputs from the at least one sensor affecting the selected seat motion plan, and executes the seat motion plan, via the seat controller, and modifies the same as necessary to accommodate changes in the environment, such as object detections.

Figure 3:
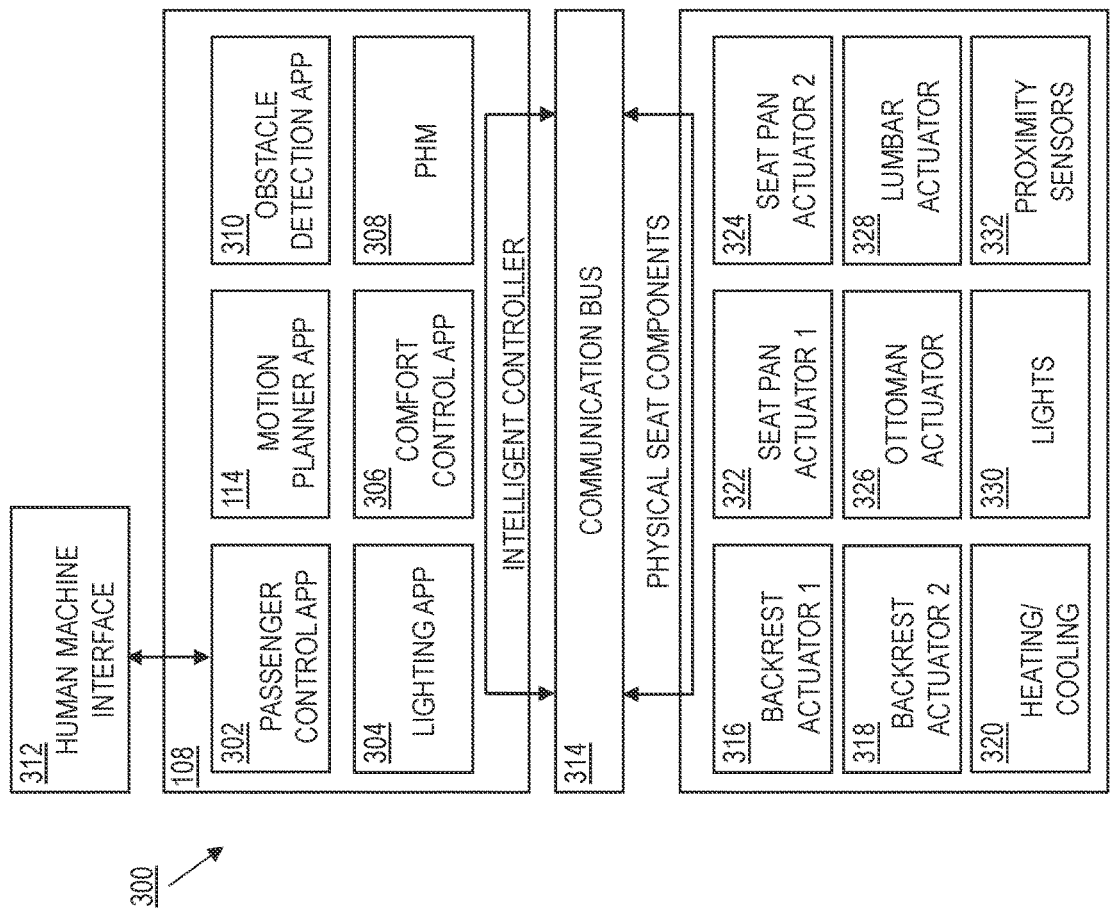
FIG. 3 is a block diagram illustrating a multiple process control board architecture, in accordance with example embodiments of this disclosure.

FIG. 3 illustrates a seat architecture 300 that utilizes a multiple process control board running a microservices enabled operating system to improve seat performance and simplify software development. The microservices architecture allows the software to be segmented based on function thereby simplifying the software code. For example, the seat controller 108 may be configured with various applications including, but not limited to, a passenger control application 302, lighting application 304, comfort control application 306, predictive health management (PHM) application 308, the motion planner application 114, and collision detection application 310. In some embodiments, the motion planner application 114 and obstacle detection application 310 may be consolidated into one single application. The seat controller 108 is communicatively coupled with an input/output interface 312, for instance a touch screen display including graphical elements.

The seat controller 108 communicates with the physical seat components via a communication interface 314 which may include, for example, a transmitter, receiver, transceiver, physical connection interface, or any combination thereof. The physical seat components, controllable via instructions from the seat controller 108 may include, but are not limited to, backrest actuators 316, 318 (e.g., one operable for rotation and another extension), seat climatization 320, seat pan actuators 322, 324 (e.g., one operable for translation and another rotation), ottoman actuator 326, lumbar actuator 328, lighting 330, and proximity sensing 332.

In embodiments, the motion planner may be its own application 114, using information from internal process communication (IPC) provided by the actuator sensors and a kinematic/dynamic model application (not shown) to determine an obstruction free path for the seat to move from one predetermined sitting position to another. The collision detection application 310 may run concurrently, checking for collisions with detected obstacles. The separation of functions is beneficial in that peripheral functions, for instance lighting control, may be modified to allow for new features, without having to re-certify the safety critical applications. In embodiments, the seat controller architecture allows the passenger control unit, seat control unit, pneumatic control unit, and climatization unit to be implemented on a single controller while keeping modularity of the software. In embodiments, the seat controller has the computational power to implement obstacle free motion planning using a point cloud model of the seat environment, kinematic model, and occupancy to calculate a collision free path without requiring manual tuning.

Figure 4:
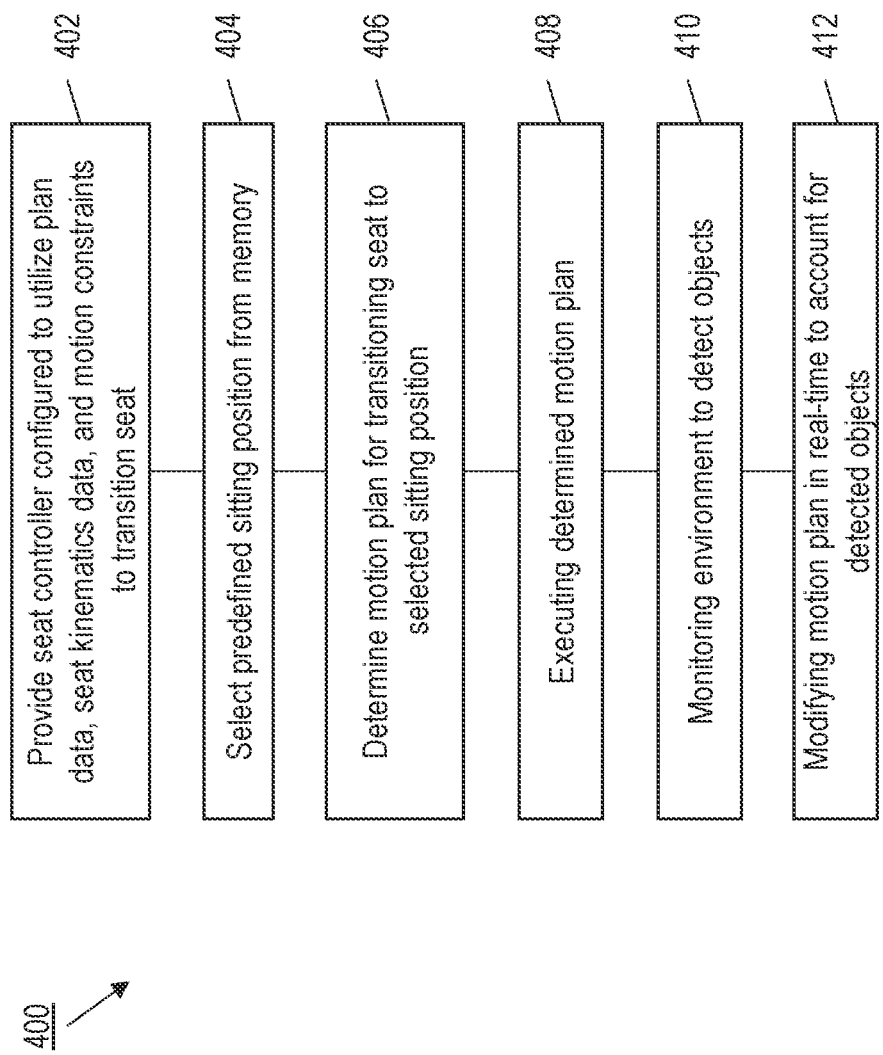
FIG. 4 is a flow diagram illustrating an example implementation of a method of seat motion planning, in accordance with example embodiments of this disclosure.

FIG. 4 illustrates a method of seat motion planning at 400. It is to be understood that embodiments of the method according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to, one or more of the steps disclosed herein.

At Step 402, the method includes providing a seat motion controller configured to read—in CAD model data, kinematic model data, and tabular or profiled motion constraints. This configuration allows for scaling of the control algorithms to different seats with different numbers of actuators as the changes are reflected in the model data supplied to the seat controller. The process to create the models, tables and profiles used to configure the controller may be automated. In some embodiments, the seat controller is further configured to receive.

At Step 404, the seat occupant selects, via the seat interface device, a predefined sitting position. At Step 406, the motion controller determines a motion plan for transitioning the seat from the current sitting position to the selected predefined sitting position considering the plan data, seat data and motion constraints. At Step 408, the motion planner instructs the seat controller to execute the determined motion plan. In embodiments including environment sensors interfacing with the motion planner, at Step 410 the environment associated with the motion path is monitored for objects motions, for instance transient objects affecting the travel path of the seat components. At Step 412, the motion plan may be modified considering the detected objects affecting the travel path of the seat components.

In embodiments, the motion plan includes instructions for the involved actuators to complete the seat transition. For example, the determined motion plan may include a first seat component motion to be performed by at least one independent actuator and at least one second seat component motion to be performed by at least one dependent actuator, wherein the first seat motion is programmed to start before the second seat motion. A modification to the motion plan considering a detected object may include, for example, at least one of delaying the start of the second seat motion, pausing the second seat motion, slowing a speed of the first seat motion, slowing a speed of the second seat motion, increasing a speed of the first seat motion, and increasing a speed of the second seat motion. In embodiments, the determined seat motion may include a predetermined time interval for completing the transition, and the modification to the motion plan may include at least one of delaying a start of a seat motion, pausing a seat motion, slowing a speed of a seat motion, increasing a speed of a seat motion, and varying a speed of a seat motion.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for seat motion planning, comprising:
a seat installable in an aircraft passenger cabin, the seat comprising:
a plurality of adjustable components;
a plurality of actuators configured to move the adjustable components; and
a seat controller configured to operate the plurality of actuators; and
a motion planner communicatively coupled to the seat controller, the motion planner including a processor configured to:
access a seat motion plan from a plurality of seat motion plans stored in memory, the seat motion plan including instructions for the seat controller to transition the seat from a first predetermined sitting position to a second predetermined sitting position different from the first predetermined sitting position;

access a model of the aircraft passenger cabin, the model including at least one object affecting the seat motion plan; and modify the seat motion plan to account for the at least one object;

wherein the motion planner utilizes a plurality of seat configurations stored in memory as resources.

2. The system according to claim 1, wherein:

the seat motion plan includes a first seat motion to be performed by at least one independent actuator, and a second seat motion to be performed by at least one dependent actuator;

the first seat motion is programmed to start before the second seat motion; and the modification to the seat motion plan comprises at least one of delaying the start of the second seat motion, pausing the second seat motion, slowing a speed of the first seat motion, slowing a speed of the second seat motion, increasing a speed of the first seat motion, and increasing a speed of the second seat motion.

3. The system according to claim 1, wherein:

the seat motion plan includes a predetermined time interval for completing the transition from the first predetermined sitting position to the second predetermined sitting position; and the modification to the seat motion plan includes at least one of delaying a start of a seat motion, pausing a seat motion, slowing a speed of a seat motion, increasing a speed of a seat motion, and varying a speed of a seat motion.

4. The system according to claim 1, wherein:

the plurality of adjustable components includes at least a seat pan, a backrest, and a leg rest; and the plurality actuators includes at least one actuator coupled to the seat pan, at least one actuator coupled to the backrest, and at least one actuator coupled to the leg rest.

5. The system according to claim 1, wherein the at least one object includes at least one of a shell positioned behind the seat, an ottoman positioned forward of the seat, and a console positioned to one side of the seat.

6. The system according to claim 1, wherein:

the system further comprises a multiple process control board including a processor configured to run a plurality of separate applications including the motion planner as an application and at least one of a seat control application, a lighting application, a comfort control application, an obstacle detection application, and a predictive health management application; and each of the motion planner application, the seat control application, the lighting application, the comfort control application, the obstacle detection application, and the predictive health management application is configured to be modified without affecting any other one of the applications.

7. The system according to claim 1, wherein:

the system further comprises at least one sensor positioned in the aircraft passenger cabin configured to detect at least one transient object in the aircraft passenger cabin affecting the seat motion plan; and the motion planner is configured to receive outputs from the at least one sensor and further modify the seat motion plan to account for the at least one detected transient object.

8. The system according to claim 7, wherein the at least one sensor is at least one of millimeter wave (mmWave) radar, a proximity sensor, and a camera.

9. The system according to claim 7, wherein the at least one detected transient object is a person.

10. A motion planner for a seat including a seat controller, at least one actuator configured to adjust a position of a seat component, and at least one further actuator configured to adjust a position of at least one further seat component, wherein the seat is positioned in an aircraft passenger cabin, the motion planner configured to be communicatively coupled to the seat controller, and the motion planner implemented as an application executable by a processor configured to:

access a seat motion plan from a plurality of seat motion plans stored in memory, the seat motion plan including instructions for the seat controller to transition the seat from a first predetermined sitting position to a second predetermined sitting position different from the first predetermined sitting position;

access a model of the aircraft passenger cabin, the model including at least one object affecting the seat motion plan; and modify the seat motion plan to account for the at least one object;

wherein the motion planner utilizes a plurality of seat configurations stored in memory as resources.

11. The motion planner according to claim 10, wherein:

the seat motion plan includes a first seat motion to be performed by at least one independent actuator, and a second seat motion to be performed by at least one dependent actuator;

the first seat motion is programmed to start before the second seat motion; and the modification to the seat motion plan comprises at least one of delaying the start of the second seat motion, pausing the second seat motion, slowing a speed of the first seat motion, slowing a speed of the second seat motion, increasing a speed of the first seat motion, and increasing a speed of the second seat motion.

12. The motion planner according to claim 10, wherein:

the seat motion plan includes a predetermined time interval for completing the transition from the first sitting position to the second sitting position; and the modification to the seat motion plan includes at least one of delaying a start of a seat motion, pausing a seat motion, slowing a speed of a seat motion, increasing a speed of a seat motion, and varying a speed of a seat motion.

13. The motion planner according to claim 10, wherein the at least one object in the aircraft passenger cabin includes at least one of a seat shell positioned behind the seat, an ottoman positioned forward of the seat, and a console positioned to one side of the seat.

14. The motion planner according to claim 10, wherein:

the motion planner application is communicatively coupled to and configured to receive outputs from at least one sensor positioned in the aircraft passenger cabin, the at least one sensor configured to detect at least one transient object in the aircraft passenger cabin affecting the seat motion plan; and the motion planner is further configured to further modify the seat motion plan to account for the at least one detected transient object.

15. The motion planner according to claim 14, wherein the at least one sensor is selected from the group include a millimeter wave (mmWave) radar, a proximity sensor, and a camera.

16. The motion planner according to claim 14, wherein the at least one detected transient object is a seat occupant.

* * * * *